(12) United States Patent
Hayakawa

(10) Patent No.: US 6,392,533 B1
(45) Date of Patent: May 21, 2002

(54) PAGER WITH MESSAGE DISPLAY

(75) Inventor: Hideki Hayakawa, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1260 days.

(21) Appl. No.: 08/734,175

(22) Filed: Oct. 21, 1996

Related U.S. Application Data (63) Continuation of application No. 08/393,907, filed on Feb. 24, 1995, now abandoned.

Foreign Application Priority Data

Feb. 25, 1994 (JP) .............................................. 6-051023

(51) Int. Cl.[7] .............................................. H04Q 7/14
(52) U.S. Cl. ..................................... 340/7.55; 340/7.56
(58) Field of Search ........................ 340/825.44, 825.22, 340/311.1, 7.55, 7.56; 345/56, 123, 124, 125, 141; 455/45, 38.4

(56) References Cited

U.S. PATENT DOCUMENTS

| | | | | |
|---|---|---|---|---|
| 3,976,995 A | * | 8/1976 | Sebestyen | 340/825.44 |
| 4,205,312 A | * | 5/1980 | Nelson | 345/56 |
| 4,358,761 A | * | 11/1982 | Iwasaki | 345/56 |
| 4,646,081 A | * | 2/1987 | Tsunoda | 340/825.44 |
| 4,922,238 A | * | 5/1990 | Aoki et al. | 345/123 |
| 4,947,342 A | * | 8/1990 | Katsura et al. | 345/141 |
| 4,951,039 A | * | 8/1990 | Schwendeman | 340/825.44 |
| 4,952,927 A | * | 8/1990 | DeLuca et al. | 340/825.44 |
| 5,146,612 A | * | 9/1992 | Grosjean et al. | 455/45 |

* cited by examiner

*Primary Examiner*—Edwin C. Holloway, III
(74) *Attorney, Agent, or Firm*—Louis Woo

(57) ABSTRACT

A pager for alerting the user and dispalying received message data when the received ID code agrees with the ID code of the pager, includes: a dot matrix display, having dot matrix of a×b, for displaying the message data; a detector for detecting a total length of the message data when the message data is displayed on the dot matrix display and whether or not the total length is larger than the a; and a display control portion for displaying a portion of the message data on the dot matrix display with the displayed message data scrolled by a predetermined number of dots every predetermined interval in the direction defined by the a when the size is larger than the a. The predetermined number and interval are stored in memory and can be changed according to an operation of a key switch or a detected control code, the control code being further included in the pager signal. The message is scrolled in either the forward or the reverse horizontal direction in response to key switches and the scrolled speed, i.e., pitch of dots and the scroll interval, can be changed. The pager further includes a character ROM for generating character image data according to the received message data. The total length of the message is detected by detecting the number of the message data or the character image data.

5 Claims, 6 Drawing Sheets

PAGER WITH MESSAGE DISPLAY

This application is a continuation of U.S. patent application Ser. No. 08/393,907 filed Feb. 24, 1995, now abandoned.

BACKGROUND OF THE INVENTION

1. Field of the Invention

This invention relates to a pager for receiving and displaying a message transmitted through a radio wave.

2. Description of the Prior Art

A pager for receiving and displaying a message transmitted through a radio wave is known. Such a prior art pager receives a radio wave signal transmitted by a base station, demodulates the radio wave signal, detects an identification (ID) code data, and receives a message when the identification code data agrees with the identification code of the pager, and alerts the user and displays the message on a dot matrix display. In this prior art pager, if the length of the message is less than or equal to the number of characters displayed on the display, the message is displayed as it is. However, if the length of the message is larger than the number of characters which can be displayed on the display at the same time, the message is displayed as follows:

At first, a top block of the message is displayed for a predetermined interval and the portion of the message displayed is scrolled from the right end to the left end by one character by one character. That is, the most left character is erased and the second most left character to the most right character are shifted to the left, and a new character is displayed at the most right position. This operation is repeated until the end of the message is displayed. That is, the scroll is made character by character and the scroll speed is fixed. Alternatively, at first, a top block of the message is displayed for a predetermined interval and then the following block of the message is displayed. This operation is repeated until the end of the message is displayed. That is, the scroll is made row by row and the scroll speed is fixed.

SUMMARY OF THE INVENTION

The aim of the present invention is to provide an improved pager.

A pager for alerting the user and displaying received message data when the received ID code agrees with the ID code of the pager, comprising: a dot matrix display, having dot matrix of a (horizontal)×b (vertical), for displaying the message data; a detector for detecting a total length of the message data when the message data displayed on the dot matrix display and whether or not the total length is larger than the a; and a display control portion for displaying a portion of the message data on the dot matrix display with the displayed message data scrolled by a predetermined number of dots every predetermined interval in the direction defined by a when the total length is larger than a. The predetermined number and interval are stored in memory and can be changed according to an operation of a key switch or a detected control code, the control code being further included in the pager signal. The message is scrolled in either the forward or the reverse horizontal direction in response to key switches and the scrolled speed, i.e., pitch of dots and the scroll interval, can be changed. The pager further comprises a character ROM for generating character image data according to the received message data. The total length of the message is detected by detecting the number of the message data or the character image data.

According to the present invention there is provided a pager for receiving a transmitted pager signal, including identification code data and message data, and for displaying the received message data, comprising: a receiving portion for receiving the transmitted pager signal; a demodulator for demodulating the received pager signal; a detector for detecting the identification code data and detecting and receiving the message data from the demodulated pager signal when the identification code data agrees with an identification code assigned to the pager; an alert portion for alerting a user of the pager when the detected identification code data agrees with the identification code assigned to the pager; a dot matrix display, having dot matrix of a×b, for displaying the message data, a and b being natural numbers; a detection portion for detecting a total length of the message data when the message data is displayed on the dot matrix display and whether or not the total length is larger than a; and a display control portion for displaying a portion of the message data on the dot matrix display with the displayed message data scrolled by a predetermined number of dots every predetermined interval in the direction defined by a when the size is larger than a.

The Pager mentioned above further comprises a memory for storing first data indicative of the predetermined number and second data indicative of the predetermined interval, the display control portion displaying the portion of the message data on the dot matrix display with the message data scrolled by the predetermined number of dots every predetermined interval in accordance with the first and second data from the memory. This pager may further comprise a setting portion for generating the first or second data in accordance with a setting signal and storing the generated first or second data in the memory. Moreover, the pager signal may include a control code and the pager may further comprise a second detection portion for detecting the control code and producing the setting signal in accordance with the detected control code.

In the pager mentioned above, the display control portion displays the portion of the message data on the dot matrix display with the message data scrolled in either of the forward or reverse direction along direction in response to a direction command signal.

The pager mentioned above may further comprise a character image generation portion for generating character image data in accordance with the received message data, the dot matrix display displaying the message data using the character image data, the detection portion detecting the total length of the message data by detecting a number of the character image data.

According to the present invention there is also provided a pager for receiving a transmitted pager signal, including identification code data and message data and for displaying the received message data, comprising: a receiving portion for receiving the transmitted pager signal; a demodulator for demodulating the received pager signal; a detector for detecting the identification code data and detecting and receiving the message data from the pager signal from the demodulator when the identification code data agrees with an identification code assigned to the pager; an alert portion for alerting a user of the pager when the detected identification code data agrees with the identification code assigned to the pager; a character image generation portion for generating character image data in accordance with the received message data; a dot matrix digplay, having dot matrix of a×b, for displaying the character image data, a and b being natural numbers; a detection portion for detecting a size of the character image data when the character image data is displayed on the dot matrix display and detecting whether or not the size is larger than a; and a display control portion for displaying a portion of the character image data on the dot matrix display with the character image data scrolled by a predetermined number of dots every predetermined interval in the direction defined by a when the size is larger than a.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Figure 1:
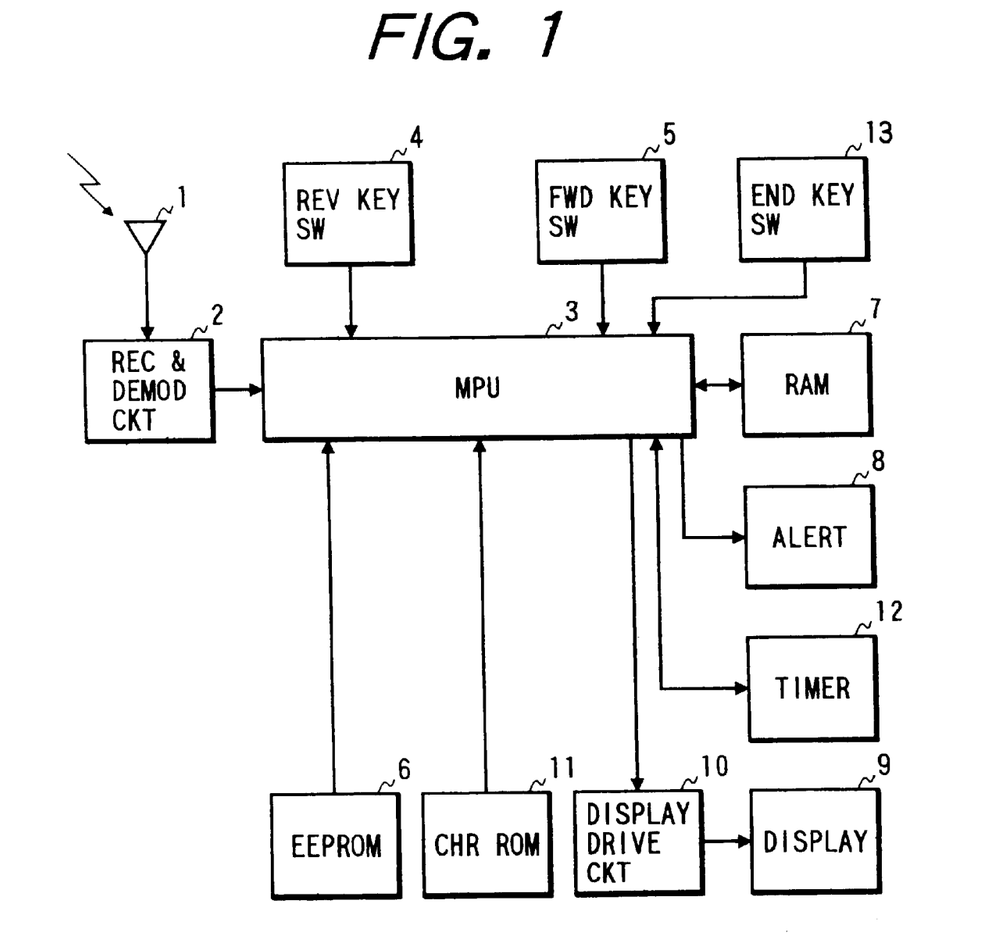
FIG. 1 is a block diagram of a pager of an embodiment of this invention.

Hereinbelow will be described an embodiment of this invention. FIG. 1 is a block diagram of a pager of the embodiment of this invention.

A radio wave signal including a pager signal including identification code (ID) data, message data (character code data or image data), command data (control code) transmitted by a base station (not shown) is received by an antenna 1 wherein the command data may be omitted. The received radio wave signal is supplied to a receiving and demodulation circuit 2. The receiving and demodulation circuit 2 receives and demodulates the radio wave signal to supply demodulated pager signal to the CPU (central processing unit) 3. The CPU 3 receives the pager signal and detects the identification code data and compares it with the identification code of this pager read from an EEPROM (electrically erasable/programmable read only memory) 6. If the identification code data in the pager signal agrees with the identification code of this pager, the CPU 3 detects the message data and stores it in a RAM (random access memory) 7. Then, the CPU 3 operates an alert portion 8 to alert the user to inform the reception of the message. The CPU 3 generates character image data indicative of the message when the message data is transmitted by character code data. That is, the CPU 3 converts the character code of the message data read from the RAM 7 into character image data through a character ROM (read only memory) 11. When the message data is transmitted in the form of the character image data, this operation can be omitted. In response to an operation of a forward key switch 5 by the user, the CPU 3 scrolls the display image in the forward direction. In response to an operation of a reverse key switch 4 by the user, the CPU 3 scrolls the display image in the reverse direction.

Figure 2:
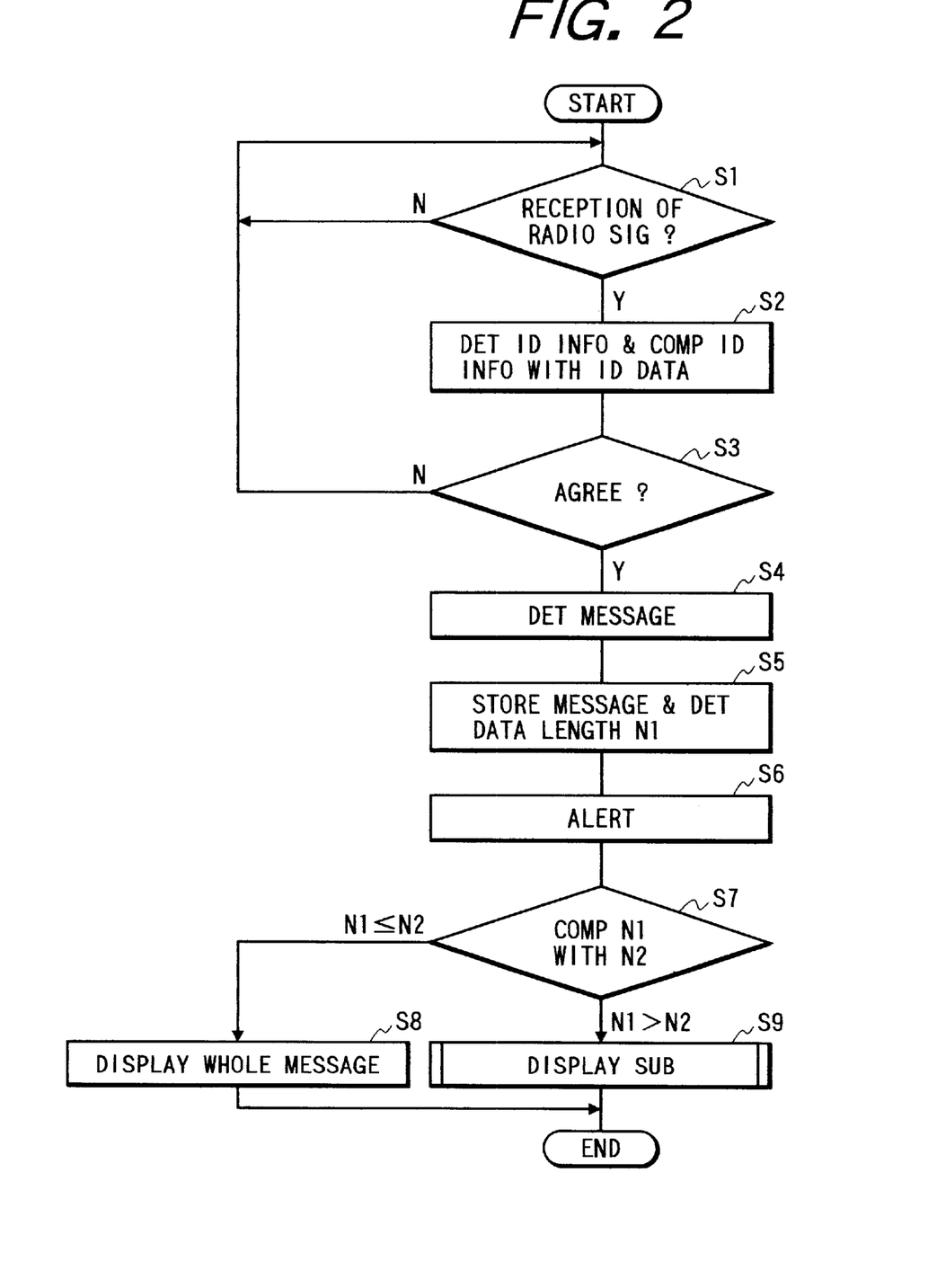
FIG. 2 shows a flow chart of this embodiment.

FIG. 2 shows a flow chart of this embodiment. In step s1, the CPU 3 detects whether or not the radio wave signal including the pager signal is received. If the radio wave signal is received, the CPU 3 receives the pager signal demodulated from the radio wave signal and detects the identification code data included in the pager signal and compares it with the identification code of this pager read from the EEPROM 6 in steps s2 and s3. If the identification code data in the pager signal agrees with the identification code of this pager, the CPU 3 detects the message data including the pager signal in step s4. In the following step s5 the CPU 3 stores the message data in the RAM 7. Here, if the message data is of character data, the CPU 3 converts the message data into the character image data in the RAM 7 from an address AD1 to an address ADn. That is, the CPU converts one character code into a dot matrix of 16×16 data and stores the dot matrix data in the RAM 7. The CPU 3 repeats this conversion and storing operation until all message data have been converted. Therefore, in the RAM 7, a character image train corresponding to the message is stored. In the case of the message data being the character image data, the CPU 3 stores the character image data from the address AD1 to the address ADn. Then, the CPU 3 detects a data length N1. Here, the data length is obtained from the number of bit or bytes of the character image data transmitted or converted or the number of the character code data included in the pager signal. Here, it is predetermined which type of the character code data or character image data is transmitted.

Moreover, if there is command data in the pager signal, the CPU 3 stores the command data in the RAM 7.

Figure 3:
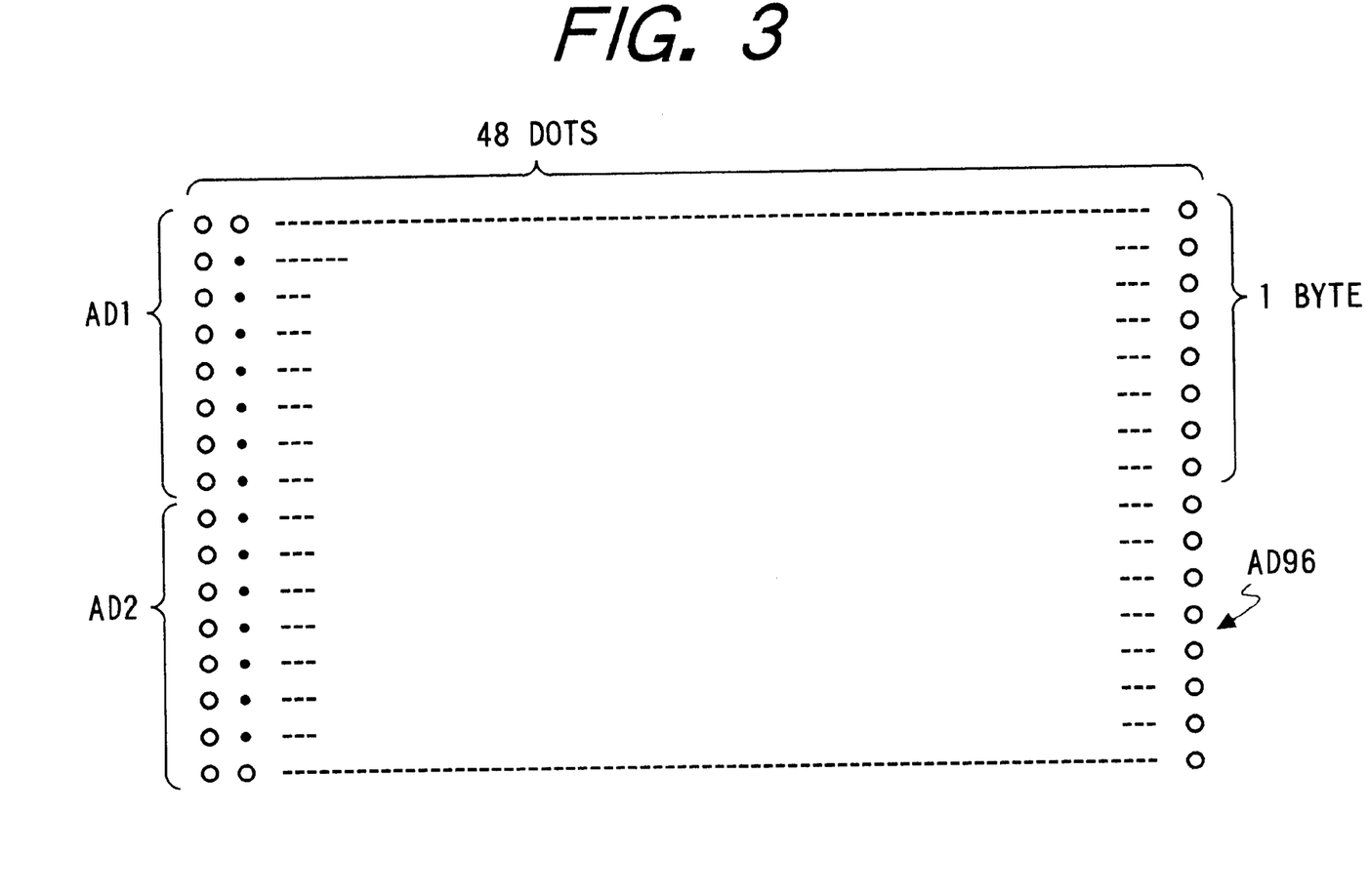
FIG. 3 is an illustration of this embodiment of arrangement of dots of the display shown in FIG. 1.

FIG. 3 is an illustration of an embodiment arrangement of dots of the display 9 and memory addresses of the RAM 7 corresponding the dots wherein the memory addresses are represented at the initial display condition of a message wherein the memory addresses will be changed with the scrolling of the display 9. In this embodiment, the display 9 has a dot matrix display of 48 (horizontal)×16 (vertical) dots. Therefore, this display displays just three Kanji characters (Chinese character) or it has three columns and one row display area.

Then, the CPU 3 operates an alert portion 8 to alert the user to inform the reception of the message in step s6.

In the following step s7, the CPU 3 compares the data length N1 with a predetermined number N2 corresponding the horizontal size of the display 9, or the number of dots in the horizontal direction. If N1≦N2, the CPU 3 operates the display drive circuit 10 to display the whole message on the display 9 in step s8. More specifically, the CPU 3 reads the character image data from the RAM 7 and supplies a display control signal in accordance with the character image data to the display drive circuit 10. The CPU 3 operates the display drive circuit 10 to display the character image on the display 9.

If N1 is larger than N2 in step s7, that is, the message cannot be displayed at the same time, the CPU 3 displays the message in a display subroutine s9. After the step s8 and the display subroutine, this processing ends.

Figure 4:
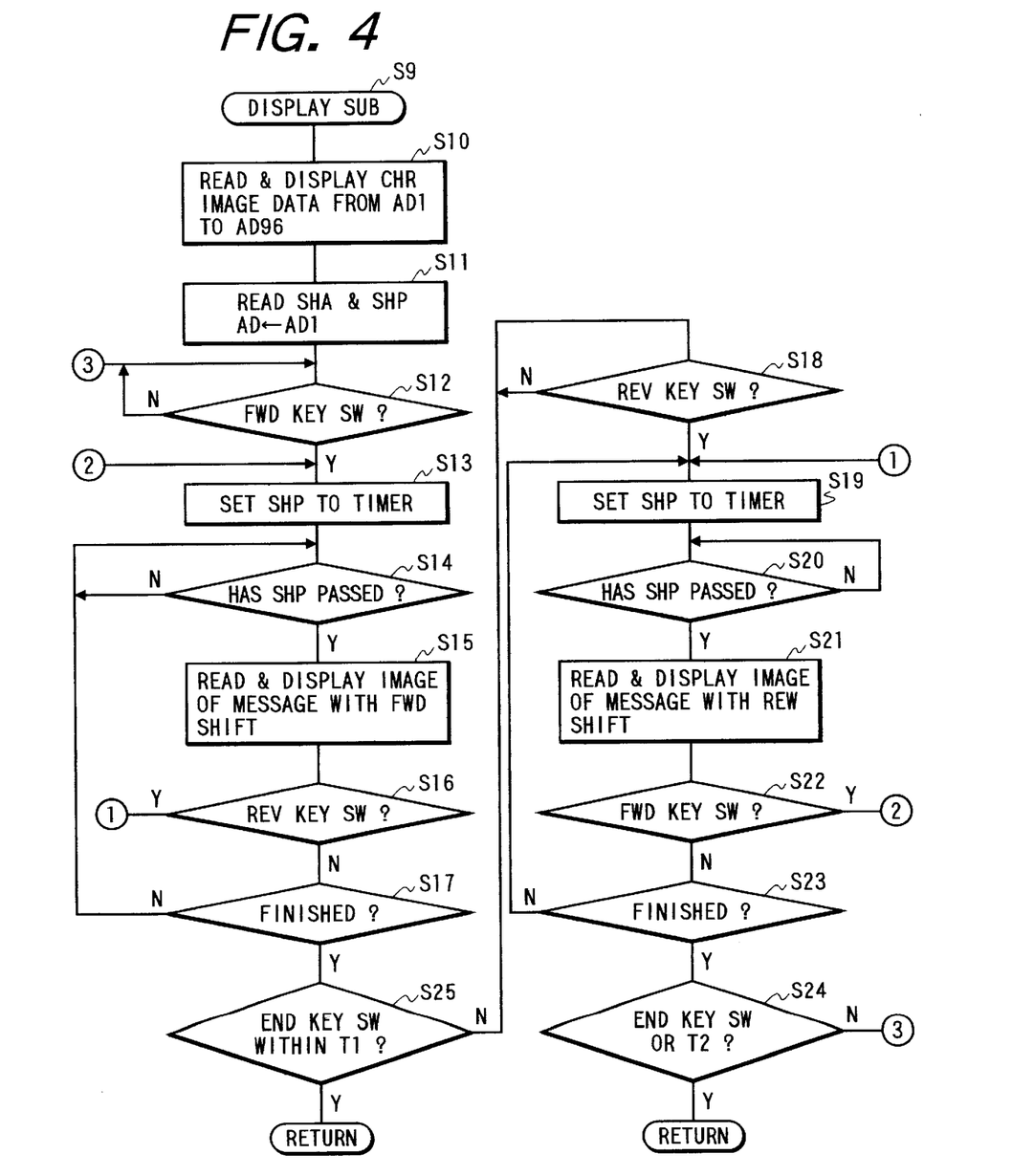
FIG. 4 shows a flow chart of the display subroutine of this embodiment shown in FIG. 2.

FIG. 4 shows a flow chart of the display subroutine of the embodiment shown in FIG. 2.

In step s10, the CPU 3 reads the character image data from the RAM 7 from the address AD1 to AD96 corresponding to a top portion of the message which can be displayed on the display 9 at an instance and supplies it to the display drive circuit 10 and executes an operation AD (start address)= AD+AD1. Therefore, the display 9 displays the top portion of the message.

In the following step s11, the CPU 3 reads a shift amount SHA and a shift period SHP from the EEPROM 6. Then, the CPU 3 detects a depression of the forward key switch 5 in step s12. If the forward key switch 5 is depressed, the CPU 3 sets the shift period SHP to the timer 12 and starts the timer in step s13. If the shift period has passed in step s14, the CPU 3 reads the image data from the start address AD=AD+ SHA to an end address AD+96+SHA in the forward direction (right). Therefore, a portion of the character image which is shifted by the shift amount SHA, for example two columns, from the initial display condition is displayed. This processing from the step s14 to s17 is repeated until all character images have been displayed or the reverse key switch 4 is depressed. If all character images have been displayed in step s17, the CPU 3 waits for the depression of the end key switch 13 in step s25. If the end key switch 13 is depressed within a predetermined interval T1, processing returns to the main routine in FIG. 2. If the end key switch 13 is not depressed within the predetermined interval T1, the CPU waits for the depression of the reverse key switch 4 in step s18. If the reverse keys switch 4 is depressed, the CPU 3 sets the shift period SHP to the timer 12 and starts the timer in step sl9. If the shift period SHP has passed in step s20, the CPU 3 reads the image data from a start address AD=AD− SHA to an end address AD=AD+96−SHA. Therefore, a portion of the character image which is shifted by the shift amount in the reverse direction, for example, character images are shifted in the left by two columns by two columns. This processing from the step s19 to s23 is repeated until the display 9 displays the top portion of the character image or the forward key switch 4 is depressed in step s22. When the display 9 displays the top portion of the character image, the CPU 3 waits for the depression of the end key switch 13 in step s24. If the end key switch 12 is depressed within a predetermined interval T2, processing returns to the main routine. If the end key switch 13 is not depressed within the predetermined interval T2, processing returns to step s12.

As mentioned above, the character images are displayed with scrolling wherein the scrolling is effected dot by dot.

Moreover, the shift amount in the scrolling and the shift interval in the scrolling are set by the data stored in the EEPROM 6 which is rewritten by a EEPROM writer. Therefore, a suitable displaying of the meggage is provided with the display having a length less than the length of the received message. In this processing, the displayed image is erased in response to the end key switch 13. However, the image can be erased after a predetermined period has passed. Moreover, it is also possible that if the length of the message is more than twice of the display area, after one row of the message has been scrolled, the image may be stopped and begin to scroll the image of the second row in response to the forward key switch.

Figure 5A:
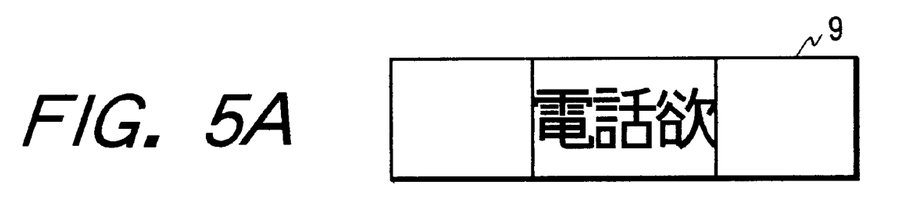
FIGS. 5A to 5E are illustrations showing the operation of this embodiment.
Figure 5B:
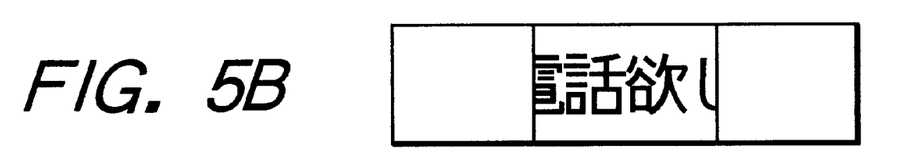
Figure 5C:
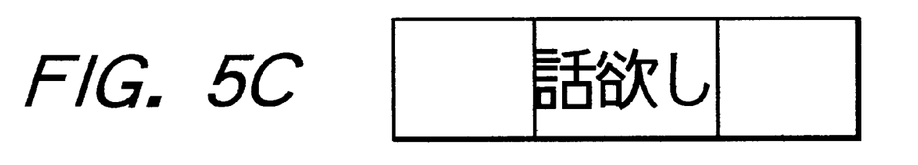
Figure 5D:
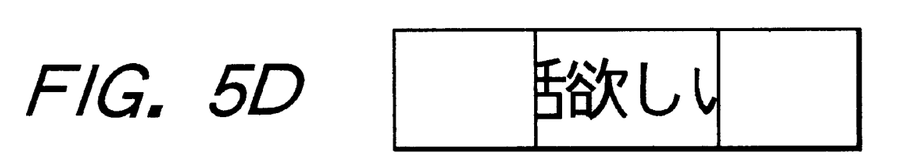
Figure 5E:
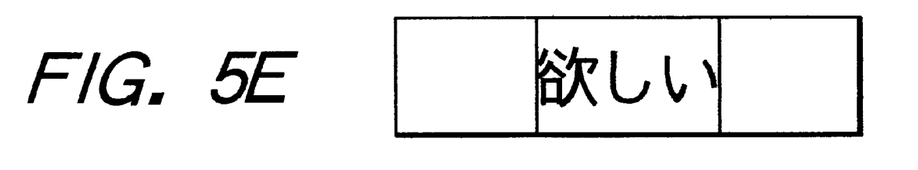

FIGS. 5A to 5E are illustrations showing the operation of this embodiment. FIG. 5A shows the top portion of the message images. FIG. 5B shows a first shifted image wherein the image is shifted by a half of a character, that is, SHA=8 dots (column) after 0.5 sec from FIG. 5A. FIG. 5C shows a second shifted image wherein the image is shifted by one character, that is, 16 dots (column) after 1.0 sec from FIG. 5A. FIG. 5D shows a third shifted image wherein the image is shifted by one and a half characters, that is, 24 dots (column). FIG. 5E shows a fourth shifted image wherein the image is shifted by two characters, that is, 32 dots (column). Here, the shift amount SHA can be set freely. For example, the shift amount SHA is 24, the displayed image is scrolled or changed by row by row wherein the shift period should be set to a larger value. In other words, in order to provide a favorable feeling to the user, the larger shift amount SHA, the larger shift period SHP.

Figure 6:
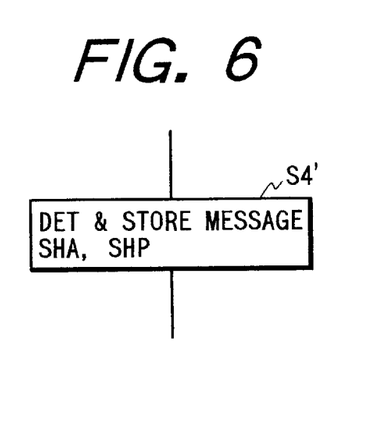
FIG. 6 shows a flow chart of a first modification of this embodiment.

FIG. 6 shows a flow chart of a first modification of this embodiment. The shift amount SHA and the shift period SHP can be changed in accordance with the detected from the pager signal and stored in the RAM 7 in step 4' which replaces the step s4 in FIG. 2. In this case, the CPU 3 reads the shift amount SHA and SHP from the RAM not from the EEPROM 6.

Figure 7:
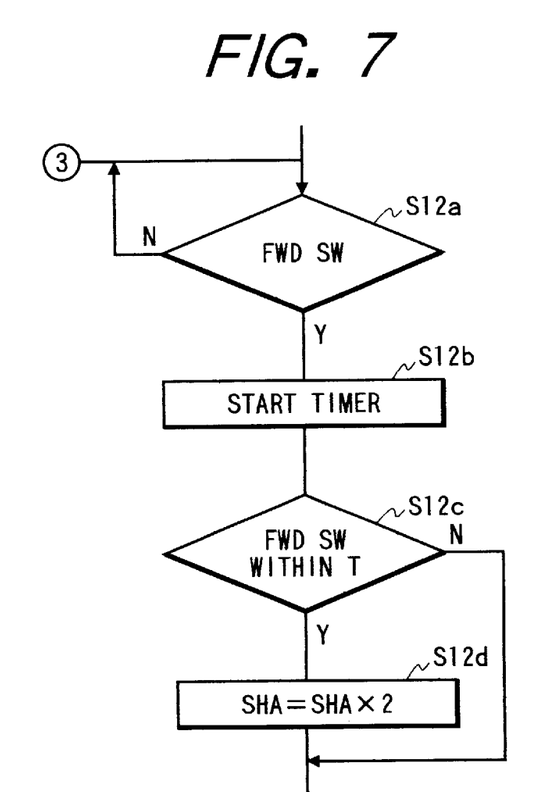
FIG. 7 shows a flow chart of a second modification of this embodiment.

FIG. 7 shows a flow chart of a second modification of this embodiment. The steps s12a to s12d replaces the step s12 in FIG. 4. In step s12a, the CPU3 detects a depression of the forward key switch 5. In the following step s12, the CPU 3 waits a predetermined interval T4. In the following step s12c, the CPU waits the depression (setting signal) of the forward key switch 5 again. If the forward key switch 5 is depressed again within a predetermined interval T5, the CPU 3 effects an operation of SHA=SHA×2 or SHP=SHP÷2 in step s12d. Therefore, the shift speed is increased.

That is, if the forward key switch is continuously depressed over the predetermined interval T5, the CPU 3 changes the shift speed. The decrease of the shift speed can be made similarly. As mentioned above, the shift amount SHA and shift period can be changed.

What is claimed is:

1. Pager for receiving a transmitted pager signal, including identification code data and message data, and for displaying said received message data, comprising:

a receiving portion for receiving said transmitted pager signal;

a demodulator for demodulating said received pager signal;

a detector for detecting identification code data and detecting and receiving said message data when said identification code data agrees with an identification code assigned to said pager;

an alert portion for alerting a user of said pager when said detected identification code data agrees with an identification code assigned to said pager;

a dot matrix display, having dot matrix of a×b, for displaying said message data, said a and b being natural numbers;

a detection portion for detecting a total length of said message data to be displayed on said dot matrix display and whether or not said total length is larger than said a;

a display control portion for displaying a portion of said message data on said dot matrix display, said display control portion scrolling a predetermined number of dots of said to be displayed message data provided to said dot matrix display at the same time every successive predetermined interval in the direction defined by said a when said total length is larger than said a so that said message data appears to be shifted by a given shift amount on said dot matrix display laid every successive predetermined interval; and a memory for storing first data indicative of said predetermined number and second data indicative of said predetermined interval, said display control portion displaying said portion of said message data on said dot matrix display with said message data scrolled by said predetermined number of dots every predetermined interval in accordance with said first and second data from said memory.

2. Pager as claimed in claim 1, further comprising a setting portion for generating said first data in accordance with a setting signal and storing said generated first data in said memory.

3. Pager as claimed in claim 2, wherein said pager signal includes a control code, said pager further comprising a second detection portion for detecting said control code and producing said setting signal in accordance with said detected control code.

4. Pager as claimed in claim 1, further comprising a setting portion for generating said second data in accordance with a setting signal and storing said generated second data in said memory.

5. Pager as claimed in claim 4, wherein said pager signal includes a control code, said pager further comprising a second detection portion for detecting said control code and producing said setting signal in accordance with said detected control code.

* * * * *